Nov. 1, 1932.  W. H. CURTIS  1,886,328
LIQUID METER SYSTEM
Filed April 16, 1929
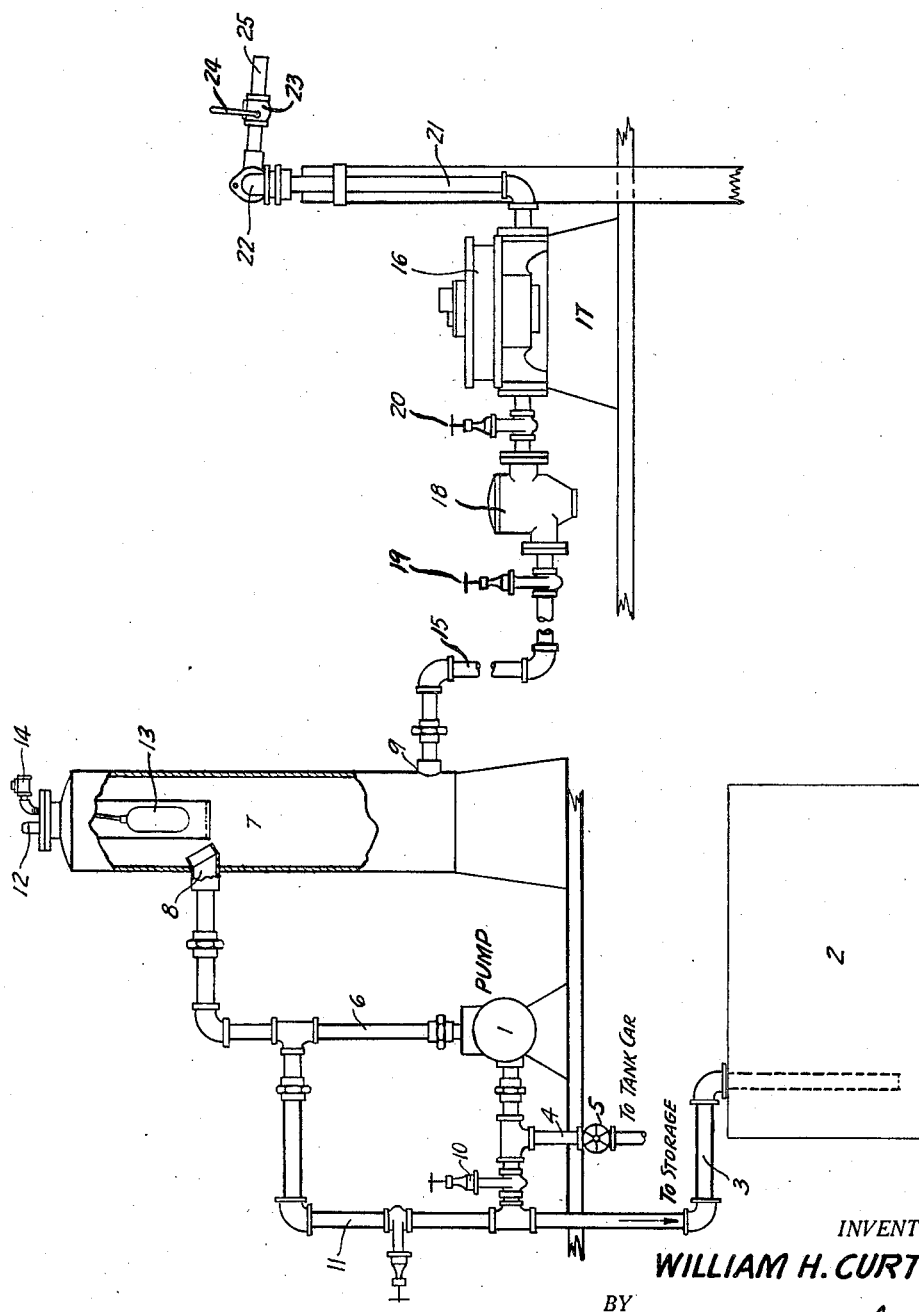
INVENTOR.
WILLIAM H. CURTIS
BY
ATTORNEY.

Patented Nov. 1, 1932

1,886,328

UNITED STATES PATENT OFFICE

WILLIAM H. CURTIS, OF PORTLAND, OREGON, ASSIGNOR TO GRANBERG METER CORPORATION, OF SAN FRANCISCO, CALIFORNIA, A CORPORATION OF CALIFORNIA

LIQUID METER SYSTEM

Application filed April 16, 1929. Serial No. 355,522.

This invention relates to systems for the measurement of liquids by meters and the like.

The principal object of this invention is to control the flow of liquids to be measured in such a manner that the rate of flow will be approximately uniform when passing through the meter.

In certain installations it has been found necessary in measuring the amount of liquid passing through a system to arrange the apparatus in such a way that the meter is placed on the discharge side of the pump. Where piston pumps are employed, especially single cylinder pumps, surges of liquid or variations in the rate of flow are produced with the result that there is a tendency to render the meter readings inaccurate and cause extraordinary strains on its moving parts.

These difficulties may be overcome by properly arranging and positioning the various units required for successful and efficient operation. For example, it is customary to insert between the pump and meter, an air and gas separator having a float-controlled air and gas valve, so that the meter will not be subject to error on account of the passage of air and vapor therethrough. It has been found that pressure pulsations in the discharge from the pump may be smoothed out by the use of a separate surge chamber, or the chamber of the separator may be used if the outlet point on the discharge side of the meter is at a certain height in relation to the position of this surge chamber. It has also been determined that this outlet should be at least above the outlet of the chamber and below the upper end of the latter, preferably below the liquid level at which the float closes the air and gas valve, in order to smooth out the surges or variations in the rate of flow, and allow the liquid to be discharged through the meter at a uniform rate.

With this in view, one manner of carrying out this invention will now be fully described, with reference to the accompanying drawing, wherein:

The figure is an elevation partly in section of the apparatus comprising this system which is the preferred method of carrying out this invention.

In the drawing the numeral 1 represents a pump of the piston type, which is connected to a storage tank 2, through the pipe 3 and may also be connected to a tank car or the like, through a pipe 4 when the valve 5 is open. The pump discharges through the connection 6 to the tank or chamber 7, having an inlet 8 and an outlet 9. The pump may also be used to transfer contents of a tank car or the like from the line 4 to the storage tank 2, by closing valve 10, and opening the valve in line 11. The chamber 7 is provided at the top with a float-controlled valve 12 which is adapted to open to allow the escape of air and vapor that may be trapped in the liquid but when the liquid level rises sufficiently to raise the float 13, the valve 12 closes to prevent the liquid from overflowing and at the same time trapping a certain amount of air in the top of the chamber 7. The top of the chamber 7 is also provided with a check valve 14 which is designed to admit air from the atmosphere should the pressure within the chamber at any time become less than the pressure on the outside.

The outlet 9 of the chamber 7 is connected through pipe 15 to meter 16, supported on a foundation 17. Strainer 18 is inserted in front of the meter 16 to remove all foreign matter contained in the liquid and valves 19 and 20 are inserted in the line 15 on each side of the strainer 18, to facilitate the cleaning of the strainer and to keep the line full of liquid, thereby preventing an accumulation of air in the line. The meter 16 discharges through line 21 to a double swing elbow joint 22, then through control valve 23 which may be quickly closed by the handle 24, and finally discharges at the outlet 25. It is important in the arrangement of the apparatus used in this metering system that the outlet 25 be above the meter 16 and its position with relation to the surge chamber 7 be at least above the outlet 9 of the chamber 7, but below the upper end of this chamber, preferably below the liquid level at which the float closes the valve 12.

Operation

Referring to the drawing, let us assume that outlet 25 is level with inlet 8 and that the liquid level in tank 7 is also at this point. The operator opens valve 23 and starts pumping. Liquid level starts to rise in tank 7 and when it reaches a sufficient height, float 13 closes valve 12. Meanwhile, due to the fact that the liquid level has risen above outlet 25, flow starts slowly through the meter. Due to the fact that the volume of tank 7 is small, the liquid level rises rapidly so that the time interval, between starting the pump and closing of valve 12, is short. Hence, before any appreciable volume of liquid has passed through the meter, valve 12 has closed. Check valve 14 which opens inwardly, usually closes concurrently with or immediately after closing of valve 12. The liquid level in tank 7 continues to rise, creating a pressure in the tank 7 due to the compression of air and gas which is trapped therein and the flow through the meter is accelerated until it equals the rate of flow which is created at the pump. The pressure in tank 7 rises until it is sufficient to overcome the friction in the pipe system, strainer 18 and meter 16 between tank 7 and outlet 25, and it remains approximately constant at this point.

Due to the fact that there is pressure above atmosphere in tank 7, there will almost always be some leakage of air and gas out of the tank because it is almost impossible to keep valves 12 and 14 absolutely tight in practice. It is also a fact that there will probably be some absorption of air and gas and also some entrainment of the same by the liquid stream which is passing through the tank so that even though there is no leakage through valves 12 and 14, it is possible that if the pumping operation continues long enough, the air and gas which has been trapped in tank 7 by the closing of valves 12 and 14, will finally almost completely disappear.

Of course, the addition of air or gas to the tank, due to inward leakage at the pump or in the suction line, would increase the volume of the trapped air and gas, provided it was introduced in appreciable volume. It is an observed fact, however, in practice, that the tendency is for the surge chamber and gas separator 7 to lose the entrapped air and gas rather than to receive increased volume thereof after the system begins normal operation.

It is necessary that a reasonable volume of air or gas be present in tank 7 in order that it will function as a surge chamber for the smoothing out of pulsations of flow, and hence if during the operation of this chamber, there is probability of its losing the necessary volume of air and gas, there must be some way arranged to automatically recover same after any liquid discharging operation. This is the function of the check valve 14.

We will assume that pumping has gone on for an appreciable interval and that there has been some leakage of air through valves 12 and 14 causing the liquid level to rise in tank 7 to within 1" or 2" of the top of the tank, completely submerging float 13 after the latter has closed valve 12. The operator stops pumping and goes to valve 23 to shut it. It is expected that he will permit a short interval of time to elapse between the time that he stops pumping and the time that he shuts valve 23. During this interval, the pressure in tank 7 will be reduced by reason of the continued flow of liquid through the meter. It will rapidly approach zero gauge pressure and if valves 12 and 14 did not open, negative pressure, that is, pressure below atmosphere, would be created in tank 7 due to the barometric effect of the column of liquid between outlet 25 and tank 7. Were it not for valve 14, this diminution in pressure would almost immediately stop the flow and in all probability if the liquid level was fairly high in tank 7 when pumping was stopped, the pressure therein would be reduced to zero before the liquid level had dropped far enough to permit float 13 to open valve 12. Hence, if check valve 14 was not provided, flow would stop and there would not be an effective air cushion in tank 7 in anticipation of the next operation. With check valve 14, present, however, air will enter tank 7, permitting the liquid level to drop until it closely approaches the level of outlet 25. Meanwhile, of course, the rate of discharge at 25 drops rapidly and it is not expected that the operator will stand by and let the liquid dribble out of the outlet for any appreciable time. He is expected, however, to wait until the flow has reduced to a small stream. During this interval, the liquid level will fall in tank 7 to a point where float 13 will descend with it and valve 12 will open. After this happens, there is no further duty for check valve 14 to perform. Upon subsequent pumping of liquid into tank 7, this valve closes as above explained.

Having now more particularly described the operation of this liquid meter system, together with the reasons underlying the arrangement shown, what is claimed is:

1. In a liquid metering system, a liquid pump, a surge chamber into which said pump discharges, an air and gas escape passage from the upper end of said surge chamber having a valve adapted to automatically close upon predetermined rise of liquid in said surge chamber, thereby trapping air and gas in the upper end of said surge chamber to cushion surges of incoming liquid, said valve having an operating float in said surge chamber, a meter-equipped discharge line leading from the lower portion of said surge chamber and having its delivery end disposed at an elevation between the top of said surge chamber and the point at which the latter communicates with said discharge line, and an air admission passage independent of said air and gas escape passage and having pressure-actuated means for admitting air to the upper end of said surge chamber when, after pump stopping, lowering of liquid in said surge chamber before opening of the float-operated valve, creates sub-atmospheric pressure in said surge chamber, said means being adapted to close upon subsequent existence of super-atmospheric pressure in the surge chamber when pumping liquid into the latter.

2. In a liquid metering system, a liquid pump, a surge chamber into which said pump discharges, an air and gas escape passage from the upper end of said surge chamber having a valve adapted to automatically close upon predetermined rise of liquid in said surge chamber, thereby trapping air and gas in the upper end of said surge chamber to cushion surges of incoming liquid, said valve having an operating float in said surge chamber, a meter-equipped discharge line leading from the lower portion of said surge chamber and having its delivery end disposed at an elevation between the top of said surge chamber and the point at which the latter communicates with said discharge line, and an air admission passage independent of said air and gas escape passage and having an inwardly opening check valve, said air admission passage having its outer end in communication with the atmosphere and its inner end directly in communication with the upper end of said surge chamber, said check valve being adapted to admit air to said surge chamber when, after pump stopping, lowering of liquid in said surge chamber before opening of the float-operated valve, creates sub-atmospheric pressure in said surge chamber, said check valve being adapted to close upon subsequent existence of super-atmospheric pressure in the surge chamber when pumping liquid into the latter.

WILLIAM H. CURTIS.